(12) United States Patent
Martinez et al.

(10) Patent No.: US 8,315,616 B2
(45) Date of Patent: Nov. 20, 2012

(54) MOBILE DEVICE SOLUTION THAT PROVIDES ENHANCED USER CONTROL FOR OUTGOING DATA HANDLING

(75) Inventors: Chris J. Martinez, Lake Worth, FL (US); Robert S. Sielken, Chapel Hill, NC (US); William C. Wimer, II, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 11/552,442

(22) Filed: Oct. 24, 2006

(65) Prior Publication Data

US 2008/0096505 A1    Apr. 24, 2008

(51) Int. Cl.
*H04M 3/00* (2006.01)

(52) U.S. Cl. ............ 455/418; 455/127.5; 455/419; 455/423; 455/502; 455/574; 709/238

(58) Field of Classification Search .............. 455/418, 455/556.2, 466, 127.5, 502, 574; 709/204–207, 709/238–240; 715/748; 713/300–320; 345/169; 707/618

See application file for complete search history.

(56) References Cited

U.S. PATENT DOCUMENTS

| | | | |
|---|---|---|---|
| 6,295,541 B1 | 9/2001 | Bodnar et al. | |
| 6,694,146 B1 | 2/2004 | Hardin et al. | |
| 6,842,433 B2 * | 1/2005 | West et al. | 370/312 |
| 6,941,134 B2 * | 9/2005 | White | 455/418 |
| 7,249,505 B2 * | 7/2007 | Miller | 73/290 R |
| 7,269,433 B2 * | 9/2007 | Vargas et al. | 455/502 |
| 7,283,814 B2 * | 10/2007 | Klein et al. | 455/419 |
| 7,392,047 B2 * | 6/2008 | Ranta | 455/423 |
| 7,505,795 B1 * | 3/2009 | Lim et al. | 455/574 |
| 2001/0011032 A1 * | 8/2001 | Suzuki | 455/574 |
| 2003/0046421 A1 * | 3/2003 | Horvitz et al. | 709/238 |
| 2004/0187133 A1 | 9/2004 | Weisshaar et al. | |
| 2004/0198468 A1 | 10/2004 | Patel et al. | |
| 2004/0204183 A1 * | 10/2004 | Lencevicius et al. | 455/574 |
| 2005/0059421 A1 | 3/2005 | Reed et al. | |
| 2006/0010453 A1 | 1/2006 | Illowsky et al. | |
| 2007/0190978 A1 * | 8/2007 | White et al. | 455/412.1 |
| 2007/0264948 A1 * | 11/2007 | Jansson et al. | 455/127.5 |

* cited by examiner

*Primary Examiner* — Dwayne Bost
*Assistant Examiner* — Gerald Johnson
(74) *Attorney, Agent, or Firm* — Patents on Demand P.A.; Brian K. Buchheit; Scott M. Garrett

(57) ABSTRACT

The present solution can include a configurable interface for controlling data sent from a mobile device. This interface can include multiple, configurable options that permit a mobile device user to control how often outgoing data is sent from the device. These options can include: a push on schedule option, a push within a time counted from when outgoing data was queued for delivery option, a push on volume option, a push immediately option, an auto-adjusting push option, and a customized push option based upon a user-adjustable sliding scale between two competing considerations.

20 Claims, 4 Drawing Sheets

MOBILE DEVICE SOLUTION THAT PROVIDES ENHANCED USER CONTROL FOR OUTGOING DATA HANDLING

BACKGROUND

1. Field of the Invention

The present invention relates to the field of data handling and, more particularly, providing enhanced user control for outgoing data handling for a mobile device.

2. Description of the Related Art

Mobile devices are an important component of an ever-expanding communication network. A variety of mobile devices keeps families abreast of each others' whereabouts and business people current with essential information. Technological advances continue to produce mobile devices with more power and the ability to perform a wider spectrum of functions. Additionally, mobile devices provide a convenience in size, availability, and quality.

As a result of the proliferation of mobile devices into the business world, the manner in which mobile devices exchange data is of critical importance. Delays in sending or receiving data can have a detrimental impact on how and when a mobile device user performs business. Advances have been made in an attempt to overcome issues with data handling. However, many of these advances have been implemented in hardware and network protocols.

Although helpful, advances of this nature do not afford any control of data handling to the device user. For example, a device that automatically adjusts the data transmission speed due to a hardware component does so without any user interaction or control. Therefore, the device user cannot control when the device changes transmission speed and cannot override the component.

Further, these manners often do not compensate for dynamic changes in multiple network or environmental factors. For example, changes made to device data handling based on the device's current connectivity speed may do so without regard to the device power level or type of data being transmitted. Such factors are often of importance to a device user and can be critical to how or when a user would desire to transmit data.

Many existing user controls are simple, much like a light switch—either on or off. Data is either always transmitted or the transmission must be manually initiated by the user. Such controls are burdensome for users and lack a granularity of control that would allow a user to customize how and when data should be sent from the device. Other existing schemes for controlling outgoing date are extremely complex and require information pertaining to a computing space external to the mobile device and/or can require computing operations be performed by components external to the mobile device. Acquiring external information or relying upon external computing operations can be overly complex to implement and can needlessly consume the very resources, such as battery life and bandwidth, that a user is attempting to conserve or regulate by manipulating the user controls.

SUMMARY OF THE INVENTION

The present invention discloses a solution for providing users of mobile devices with enhanced controls for the handling of outgoing data. More specifically, the solution provides a mobile device user with a means to select options for data handling that are customizable for how they use their device. The options can include a set of options that permit a user to alter behavior of an outgoing data handler to maximize battery life of the mobile device, to ensure outgoing data is delivered in a timely fashion, and to balance between timely delivery and maximizing battery life. These options can be presented in a graphical user interface and can include adjustable parameters, such as a parameter to adjust a time associated with a scheduled transmission. In the solution, an outgoing data queue can be established to temporarily store data items for grouped transmissions, which conserves battery life compared to instantaneous transmissions of all data items.

The present invention can be implemented in accordance with numerous aspects consistent with the material presented herein. For example, one aspect of the present solution can include a configurable interface for controlling data sent from a mobile device. This interface can include multiple, configurable options that permit a mobile device user to control how outgoing data is sent from the device. These options can include a push on schedule option, a push within a time counted from when outgoing data was queued for delivery option, a push on volume option, a push immediately option, an auto-adjusting push option, and a customized push option based upon a user-adjustable sliding scale between two or more competing considerations.

Still another aspect of the present invention can include a system for sending data from a mobile device to a remotely located server that is tailored for a user's usage patterns. The system can include a graphical user interface, a data exchange manager, and an outgoing data queue. The graphical user interface can be configured to select a data transmission option from a set of data transmission options, wherein the set of data transmission options includes an option for an immediate transmission, a time-scheduled transmission option, and a queued volume-based transmission option. Additionally, the data exchange manager can be configured to execute an algorithm to determine when to initiate a data transmission based upon the option selected by the user in the interface.

Yet another aspect of the present invention can include a method that can allow users to adjust how a mobile device handles outgoing data. The method can include steps to display user-selectable data transmission options, to receive selection of an option, and to execute an algorithm associated with the option. The display step can include presenting the transmission options to the user within an interface for the mobile device.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
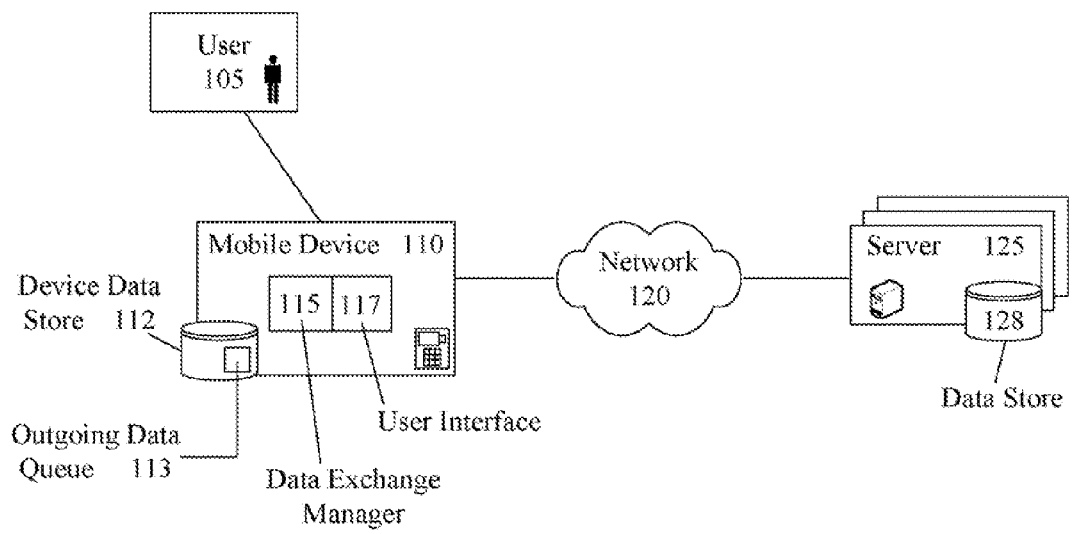
FIG. 1 is a schematic diagram illustrating a system that provides enhanced user control for outgoing mobile device data in accordance with embodiments of the inventive arrangements disclosed herein.

FIG. 1 is a schematic diagram illustrating a system 100 for a mobile device solution that provides enhanced user control for outgoing data in accordance with embodiments of the inventive arrangements disclosed herein. Mobile device 110 can include a variety of computing devices capable of wireless communication with a server 125 over a network 120 for the purpose of data transfer. Mobile device 110 can include, for example, a mobile telephone, a two-way radio, a personal data assistant, a mobile entertainment system, a portable media player, a computing table, a notebook computer, a wearable computing device, and the like. The transmission of data from the mobile device 110 to a server 125 can be controlled by a data exchange manager 115 residing on the mobile device 110.

The data exchange manager 115 can include a user interface 117 in which to present a user 105 of the mobile device 110 with options to control the transmission of outgoing data. The options can include a set of options that permit a user to alter behavior of an outgoing data handler to maximize battery life of the mobile device, to ensure outgoing data is delivered in a timely fashion, and to balance between timely delivery and maximizing battery life. Thus, the options allow a user to adjust outgoing data transmission behavior in a manner consistent with the user's usage patterns of the mobile device 110.

The selection of a transmission option by a user 105 can cause the data exchange manager 115 to execute application code that determines when to transmit data. The determination of data transmission by the data exchange manager 115 can include assessments of various resources of the mobile device 110.

Should data transmission not occur in an immediate fashion, the data available for transmission can be stored within an outgoing data queue 113 of the device data store 112 on the mobile device 110. When the data exchange manager 115 authorizes a data transmission, any stored data items within the outgoing data queue 113 can be transmitted to the data store 128 of the server 125. Data items can include, but are not limited to, outgoing email messages, outgoing text messages, electronic document uploads or electronic document conveyances, and synchronizations between a mobile device data store and a corresponding remotely located data store. It should be appreciated that multiple data items can be transmitted to a variety of servers 125. For example, an email can be sent to an email server while a file upload can be sent to a file server, each server being accessible over the network 120.

As used herein, presented data stores, including stores 112 and 128, can be a physical or virtual storage space configured to store digital information. Data stores 112 and 128 can be physically implemented within any type of hardware including, but note limited to, a magnetic disk, an optical disk, a semiconductor memory, a digitally encoded plastic memory, a holographic memory, or any other recording medium. Each of the data stores 112 and 128 can be a stand-alone storage unit as well as a storage unit formed from a plurality of physical devices. Additionally, information can be stored within data store 112 and 128 in a variety of manners. For example, information can be stored within a database structure or can be stored within one or more files of a file storage system, where each file may or may not be indexed for information searching purposes. Further, data stores 112 and/or 128 can utilize one or more encryption mechanisms to protect stored information from unauthorized access.

Network 120 can include any hardware/software/and firmware necessary to convey data encoded within carrier waves. Data can be contained within analog or digital signals and conveyed though data or voice channels. Network 120 can include local components and data pathways necessary for communications to be exchanges among computing device components and between integrated device components and peripheral devices. Network 120 can also include network equipment, such as routers, data lines, hubs, and intermediary servers which together form a data network, such as the Internet. Network 120 can also include circuit-based communication components and mobile communication components, such as telephony switches, modems, cellular communication towers, and the like. Network 120 can include line based and/or wireless communication pathways.

Figure 2:
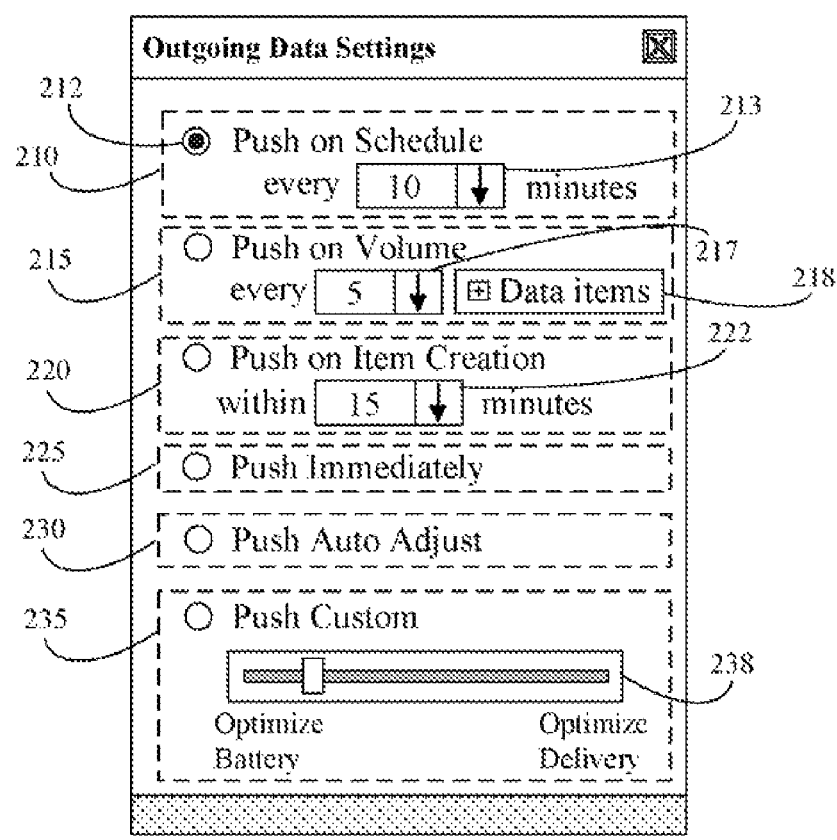
FIG. 2 is a graphical user interface (GUI) providing enhanced user controls for outgoing data handling for a mobile device in accordance with an embodiment of the inventive arrangements disclosed herein.

FIG. 2 is a graphical user interface (GUI) 200 providing enhanced user controls for outgoing data handling for a mobile device in accordance with an embodiment of the inventive arrangements disclosed herein. GUI 200 can be implemented in the context of systems 100 or any other system supporting enhanced user controls for outgoing data handling for a mobile device. For example, GUI 200 can be a representation of the user interface 117 of system 100.

GUI 200 can contain multiple user-selectable data transmission options. It should be appreciated that the data transmission options displayed within this illustration are exemplary in nature and not meant to serve as an exhaustive list of supported options nor as a limitation of the presented invention. Further, derivatives and alternates to elements shown in GUI 200 are contemplated herein and are to be considered within the scope of the present invention.

GUI 200 contains a scheduled push option 210, a volume push option 215, an item creation push option 220, an immediate push option 225, an auto-adjusting push option 230, and a custom path option 235. A selected option can be denoted by a changed interface control, such as a selected radio button 212.

The scheduled push option 210 can include a time designator 213, by which a user can specify the time interval desired between data transmissions. When this time interval expires, any queued data can be pushed to a server. Additionally, whenever a communication channel is open between the mobile device and the server, incoming data can be received. Although shown as a drop-down list in this example, the time designator 213 can be implemented in a variety of manners, such as a test entry box, a pop-up selection window, and the like. In another contemplated embodiment, the values contained with the time designator 213 can contain a variety of numeric value and unit of measure combinations. In yet another embodiment, the units of measure can be presented in a selectable manner.

The volume push option 215 can include a volume designator 217, by which a user can specify a quantity of data items to queue before initiating a data transmission. Whenever the quantity is met, data can be pushed to the server. A user of GUI 200 can further narrow the transmission control using the data type designator 218. In this example, the data type designator 218 contains a value of "Data items". However, a user can select a more specific data item type by clicking the plus indicator and selecting the desired value from the resultant expanded list. For example, a user could select a value of "Emails" from the expanded list to restrict the occurrence of data transmissions to every five queued email messages. This granularity can be particularly advantageous when a user is working with multiple data types and does not want to spend device resources on transmitting all data items as they become available.

Similar to the scheduled push option 210, the item creation push option 220 can include a time designator 222, by which a user can specify the maximum amount of time to wait after the creation of a data item to initiate a transmission. When that amount of time expires, all queued data items can be sent to the server. Although shown as a drop-down list in this example, the time designator 222 can be implemented in a variety of manners, such as a text entry box, a pop-up selection window, and the like. In another contemplated embodiment, the values contained with the time designator 222 can contain a variety of numeric value and unit of measure combinations. In yet another embodiment, the units of measure can be presented in a selectable manner.

The immediate push option 225 can institute a data transmission whenever any data item becomes available for transmission. This option represents an extreme case on the spectrum between conserving battery life and ensuring rapid delivery of outgoing items that guarantees the best delivery metric.

The auto-adjusting push option 230 can represent an means by the application code associated with the option attempts to automatically adjust the frequency of data transmissions based upon the user's usage pattern and device resources. For example, as a user creates data items more frequently, the algorithm can automatically decrease the amount of time between transmissions in order to handle the increase in volume. As the frequency of data item creation decreases, the algorithm can automatically increase the transmission time interval to maximize the amount of data transmitted. Additional adjustments to the transmission time interval can be made based on a variety of device resources, such as battery level and available bandwidth.

The custom push option 235 can allow a user to determine a degree of data transmission optimization by using a sliding scale 238. The endpoints of the sliding scale 238 can represent two competing data transmission practices. In this example, the endpoints of the sliding scale 238 correspond to transmission practices for optimizing battery usage and delivery time. These two practices can compete for the same device resources and the use of one often slights the other. For example, providing a better delivery time can mean that data transmissions occur more frequently, which consumes battery life. Conversely, attempting to conserve battery life can mean that data items are collected for batch deliveries, delaying the transmission of some items.

The invention is not to be construed as limited to the two competing considerations shown for option 235. Any of a myriad of other considerations can be substituted for battery-life and delivery time. For example, Web browsing performance can compete with outgoing data transfers for network bandwidth. Locally executing programs can compete with programs involved in outgoing data transfers for CPU time and available memory. In still another example, cost can compete with optimizing outgoing delivery in situations where subscribers pay a service fee for transmitting data items.

Further, competing considerations having more than two dimensions (not shown) are contemplated. Each of these competing dimensions can be for a dimension specific resource, such as mobile device CPU cycles, memory, network bandwidth, cost, and the like. Further, more than two considerations for the same resource can be specified, where the competing considerations establish a user configurable balance. Configurable performance ceilings and floors can also be established for each of these competing considerations.

For example, a device can be configured to favor outgoing data item transfers (consideration one) over Web browsing (consideration two), but to favor interactive gaming performance (consideration three) over outgoing data item transfers. In another example, a floor can be established for Voice over Internet Protocol (VoIP) communications that "reserves" an amount of available bandwidth for active VoIP communications, where other competing considerations (e.g., Web browsing versus optimized data item delivery) compete for remaining bandwidth only.

Figure 3:
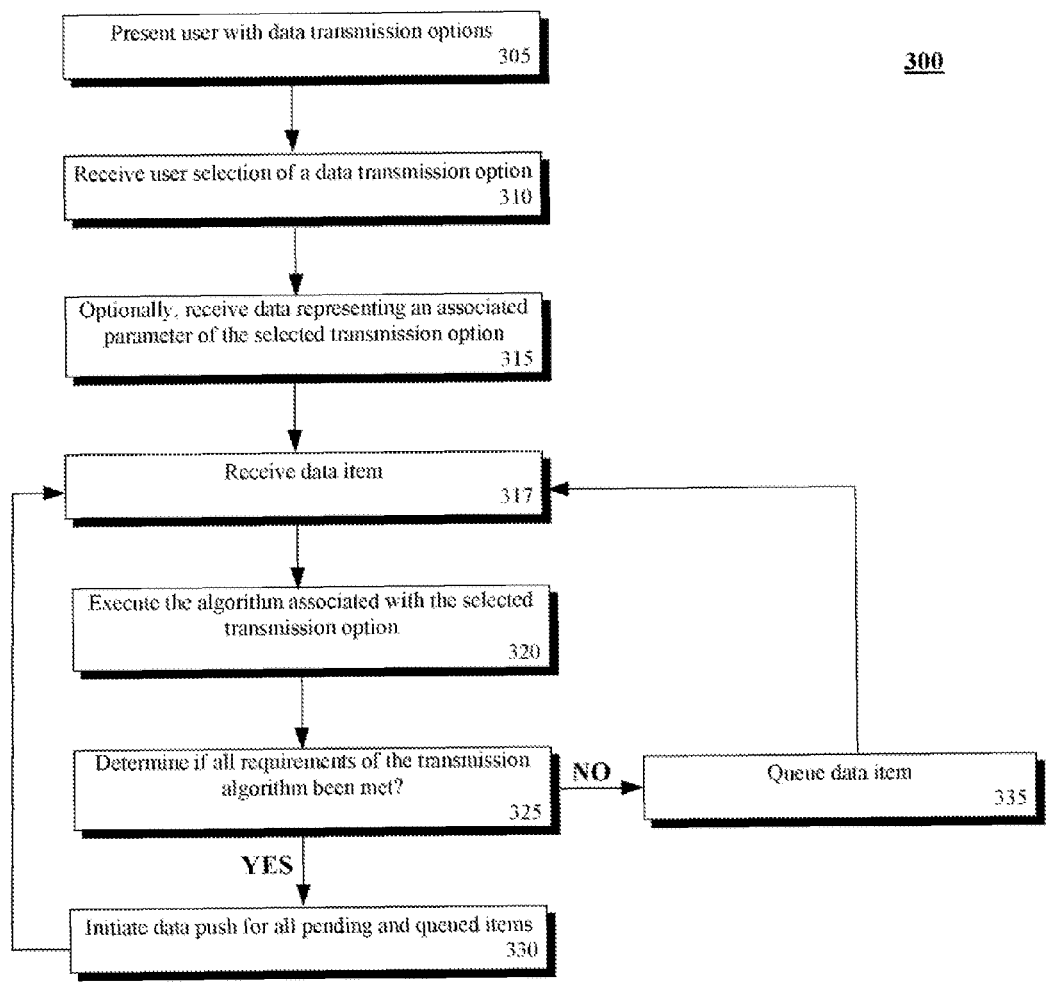
FIG. 3 is a flow chart of a method for providing a user of a mobile device with enhanced user controls for outgoing data handling in accordance with an embodiment of the inventive arrangements disclosed herein.

FIG. 3 is a flow chart of a method 300 for providing a user of a mobile device with enhanced user controls for outgoing data handling in accordance with an embodiment of the inventive arrangements disclosed herein. Method 300 can be performed in the context of system 100 and can use GUI 200 or can be performed in the context of any other system supporting enhanced user controls for outgoing data handling for a mobile device.

Method 300 can begin when a user is presented with data transmission options in step 305. In step 310, a user selection of a data transmission option can be received. In optional step 315 a user selected parameter associated with a transmission option can be received. For example, the parameter can specify a time interval for a scheduled data push option. In step 317, a data item can be received.

In step 320, an algorithm can be executed that is based upon the user selected option and user provided option parameters. In step 325, it can be determined if all the requirements of the executing algorithm have been met to permit data items to be sent. When all the algorithm requirements are fulfilled, flow proceeds to step 330 where a data push can be initiated. The data push can apply to all pending and queued items. After the data push, the method can loop to step 317, where additional data items can be received.

In the case where the requirements are not fulfilled, the method can proceed from step 325, where the received data item can be placed in a queue. The method can loop from step 335 to step 317, where an additional data item can be received. The executing algorithm continues to check system conditions whether new data items are received or not. That is, the method can permit new outgoing data items to be received in step 317, but execution of step 320 can occur independent of step 317.

Figure 4:
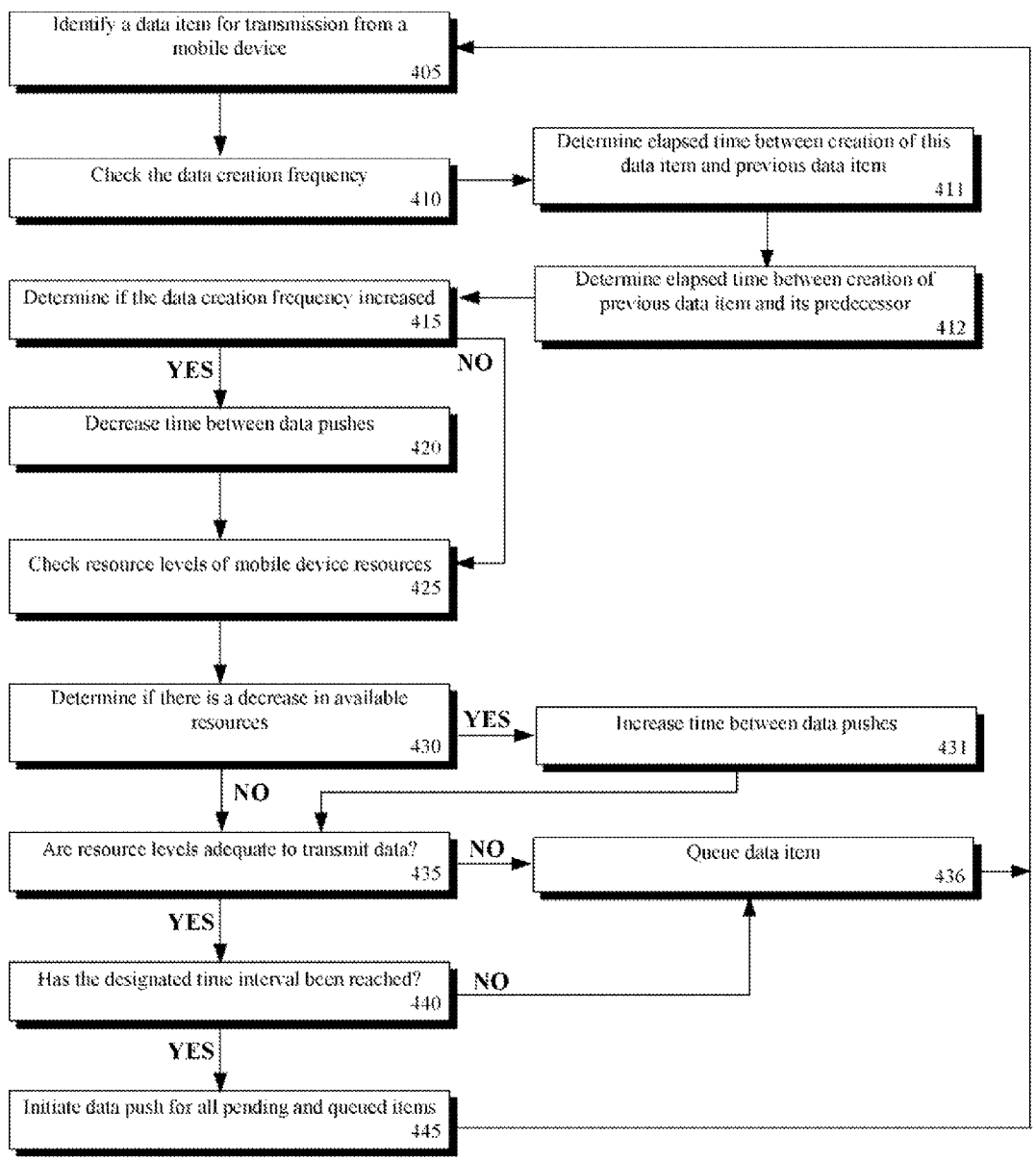
FIG. 4 is a flow chart of a method for providing an auto-adjusting data transmission option as part of enhanced user controls for outgoing data handling in accordance with an embodiment of the inventive arrangements disclosed herein.

FIG. 4 is a flow chart of a method 400 for providing an auto-adjusting data transmission option as part of the enhanced user controls for outgoing data handling in accordance with an embodiment of the inventive arrangements disclosed herein. Method 400 can be performed in the context of system 100 and can use GUI 200 or can be performed in the context of any other system supporting enhanced user controls for outgoing data handling for a mobile device.

Method 400 can begin with step 405 in which a data item can be identified for transmission. Next, the algorithm can check the data creation frequency in step 410. This action can execute steps 411 and 412. In step 411, the elapsed time between the creation of the current data item and the previous data item can be determined. In step 412, the elapsed time between the creation of the previous data item and its predecessor can be determined.

The values determined in steps 411 and 412 are necessary for the execution of step 415, in which an increase in the frequency of data creation can be calculated. Should the result of step 415 show an increase, flow proceeds to step 420 where the amount of time between data pushes can be decreased. Decreasing the amount of time between data pushes results in an increase in the frequency in which data transmissions are performed.

Step 425 occurs after the execution of step 420 or in the case where an increase in the data creation frequency is not determined. In step 425, the resource levels of the mobile device resources can be checked. A decrease in the amount of available resources can be determined in step 430.

When a decrease in the amount of available resources is determined, step 431 executes, in which the amount of time between data pushes can be increased. Increasing the amount of time between data pushes results in a decrease in the frequency in which data transmissions can be performed in order to utilize device resources more efficiently.

Step 435 occurs after the execution of step 430 or in the case where a decrease in device resource levels is not determined. In step 435, it can be determined if the current resource levels are adequate for data transmission. For example, a determination can be made as to whether bandwidth required for the transmission exists and/or whether CPU cycles needed for the transmission can be consumed without affecting other, possibly more important, tasks currently executing upon the mobile device. When resource levels are insufficient, flow proceeds to step 436 where the data can be queued for future transmission. Thus, outgoing data transmissions can be optionally delayed when these transmissions cannot readily be performed. An escalating weight (not shown) can be applied for overly delayed transmissions to ensure that outgoing transmissions are not locked in a perpetual delay cycle. The method can loop from step 436 to step 405, where new data items can be received.

Adequate resource levels cause step 440 to execute in which it can be determined if the designated time interval has been reached. It should be appreciated that this time interval corresponds to the time between pushes that can be modified by previous steps of this method. When the designated time interval has been reached, the data push is initiated in step 445. When the designated interval has not been reached, the data item can be queued by executing step 436. After queued items are transmitted in step 445, the method can loop to step 405, where new outgoing data items can be received.

It should be appreciated that method 400 represents one of many possible auto adjustments for handling outgoing data, the invention is not to be construed as limited to specific arrangements shown, and any auto adjustment can be used with the disclosed invention. For example, steps 410-415 are used to generally convey that data creation frequency can be determined and used to automatically adjust times between data pushes. Any of a number of known algorithms and approaches can be used to perform this type of frequency based adjustment. For instance, a statistical histogram (not shown) can be used to record data arrival rates and a decision to increase or decrease data push frequencies (step 420) can be based upon day of the week considerations, time of day considerations, etc.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. An apparatus comprising a configurable interface for controlling data sent from a mobile device, said apparatus comprising:

a processor configured to provide a plurality of three or more user configurable options that permit a mobile device user to control a manner in which a mobile device handles outgoing data, wherein all of the three or more user configurable options are options specially for outgoing data only, said user configurable options including at least three options selected from a group of options consisting of a push on schedule option, a push on volume option, a push within a designated time of item creation option, a push immediately option, an option based upon a relative importance of outgoing data, an auto-adjusting push option, and a customized push option based upon a user-adjustable sliding scale established between at least two competing considerations.

2. The apparatus of claim 1, wherein the outgoing data is data contained within an outgoing data queue of the mobile device, wherein said outgoing data queue stores data in a physical storage memory of the mobile device, and wherein the manner permits the user to choose a data handling algorithm that matches their usage pattern, where said different ones of the data handling algorithms are designed to maximize battery life of the mobile device, to ensure outgoing data is delivered in a timely fashion, and to balance between timely delivery and maximizing battery life.

3. The apparatus of claim 1, wherein the established configuration options control all queue-able outgoing data transmissions from the mobile device including outgoing email messages, outgoing text messages, electronic document uploads and conveyances and synchronization between the mobile device and an external data store.

4. The apparatus of claim 1, wherein all of the at least three configurable options are independent of any incoming data to the mobile device, wherein none of the configurable options are for regulating incoming data or bidirectional data to the mobile device.

5. The apparatus of claim 1, wherein said plurality of user configurable options comprise at least five options, and wherein said options include at least five options selected from the group.

6. The apparatus of claim 1, wherein one of the said options includes the push on schedule option that includes a user-configurable time, and wherein another one of said options includes the push on volume options that includes a user-configurable volume.

7. The apparatus of claim 1, wherein the outgoing data is data contained within an outgoing data queue of the mobile device, wherein said outgoing data queue stores data in a physical storage memory of the mobile device, and wherein one of said options includes said auto-adjusting push option that is configured to dynamically adjust an outgoing data frequency based upon at least two device specific conditions, one of which relates to battery life another of which relates to an outgoing data frequency, wherein the auto-adjusting option causes a related data handling algorithm to increase a frequency with which data is pushed as data items are more frequently created, and wherein the auto-adjusting option causes a related data handling algorithm to push data less frequently as battery life remaining for the mobile device decreases.

8. The apparatus of claim 1, wherein the outgoing data is data contained within an outgoing data queue of the mobile device, wherein said outgoing data queue stores data in a physical storage memory of the mobile device, and wherein one of said options includes the customized push option, wherein the at least two competing considerations include one consideration to maximize battery life and another consideration to optimize delivery frequency.

9. The apparatus of claim 1, wherein the outgoing data includes outgoing email messages, electronic document uploads, and synchronizations between a mobile device data store of the mobile device and a corresponding remotely located data store.

10. A system for sending data from a mobile device to a remotely located server that is tailored for a user's usage patterns comprising:
a graphical user interface configured to allow a user of a mobile device having communication capabilities to select a data transmission option from a set of data transmission options, wherein the set of data transmission options permits the user choose whether outgoing data transmissions of the mobile device are optimized to maximize battery life of the mobile device, whether outgoing data transmissions are optimized to ensure outgoing data items are delivered in a timely fashion, and whether outgoing data transmissions are set at a level designed to establish a balance between timely delivery of outgoing data and maximizing battery life of the mobile device, wherein said data transmission options related to maximizing battery life are explicit options of the graphical user interface specifically labeled as pertaining to battery life of the mobile device;
a data exchange manager configured to execute an algorithm to determine when to initiate a data transmission based upon a user selected option selected using the graphical user interface; and
an outgoing data queue configured to store a plurality of data items prior to transmission.

11. The system of claim 10, wherein the set of user configurable options includes at least three options selected from a group of options consisting of a push on schedule option, a push on volume option, a push within a designated time of item creation option, a push immediately option, an option based upon a relative importance of outgoing data, an auto-adjusting push option, and a customized push option based upon a user-adjustable sliding scale established between at least two competing considerations.

12. The system of claim 11, wherein said options include at least four options selected from the group.

13. The system of claim 11, wherein one of the options includes the push on schedule option that includes a user-configurable time, and wherein another one of said options includes the push on volume options that includes a user-configurable volume.

14. The interface of claim 11, wherein one of said at least two options includes said auto-adjusting push option that is configured to dynamically adjust an outgoing data frequency based upon at least two device specific conditions, one of which relates to battery life another of which relates to an outgoing data frequency, wherein the auto-adjusting option causes a related algorithm to increase a frequency with which data is pushed as data items are more frequently created, and wherein the auto-adjusting option causes a related algorithm to push data less frequently as battery life remaining for the mobile device decreases.

15. The system of claim 11, wherein one of said options includes the customized push option, wherein the at least two competing considerations include one consideration to maximize battery life and another consideration to optimize delivery frequency.

16. A method that allows users to adjust a manner in which a mobile device handles outgoing data comprising:
displaying a set of at least three user-selectable data transmission options within a transmission configuration interface of a mobile device having communication capabilities;
receiving a selection of one of the set of user-selectable data transmission options, wherein the established configuration options control all queue-able outgoing data transmissions from an outgoing data queue of the mobile device including outgoing email messages, outgoing text messages, electronic document uploads and conveyances and synchronization between the mobile device and an external data store;
storing outgoing data transmission in a physical storage memory of the mobile device; and
executing a data transmission algorithm associated with the selection.

17. The method of claim 16, wherein the set of options permits a user to alter behavior of the data handling algorithm to matches a user specific usage pattern, wherein different ones of the options in the set are designed to maximize battery life of the mobile device, to ensure outgoing data is delivered in a timely fashion, and to balance between timely delivery and maximizing battery life.

18. The method of claim 17, wherein at least one of the data transmission options includes a user-configurable parameter, said method further comprising:
receiving a data value for the user-configurable parameter associated with the selected data transmission option, selectively executing the data transmission algorithm based upon a comparison of the data value against a system determinable value indicative of a system state relating to queued content that is awaiting transmission.

19. The method of claim 17, wherein the set of user configurable options includes at least three options selected from a group of options consisting of a push on schedule option, a push on volume option, a push within a designated time of item creation option, a push immediately option, an option based upon a relative importance of outgoing data, an auto-adjusting push option, and a customized push option based upon a user-adjustable sliding scale established between at least two competing considerations.

20. The method of claim 16, wherein said steps of claim 16 are steps performed by at least one machine in accordance with at least one computer program stored within a machine readable memory, said computer program having a plurality of code sections that are executable by the at least one machine.

* * * * *